United States Patent [19]

Rosa et al.

[11] 3,967,461

[45] July 6, 1976

[54] RAMP FOR SLIDABLY SUPPORTING A PIPELINE TO BE LAID ON A SUBMERGED BED

[75] Inventors: Giovanni Rosa; Pasquale Brando, both of San Donato Milanese, Italy

[73] Assignee: Saipem S.p.A., San Donato Milanese, Italy

[22] Filed: July 19, 1974

[21] Appl. No.: 489,920

[30] Foreign Application Priority Data

July 20, 1973 Italy.................................. 26817/73

[52] U.S. Cl..................................... 61/72.3; 114/61
[51] Int. Cl.². ........................................ B63B 35/04
[58] Field of Search................... 61/72.1, 72.3, 72.4; 114/.5 R, .5 D, .5 F, 61

[56] References Cited
UNITED STATES PATENTS

| | | | |
|---|---|---|---|
| 1,152,326 | 8/1915 | Lewis................................ | 61/72.3 |
| 3,641,779 | 2/1972 | Koop et al. ........................ | 61/72.3 |
| 3,704,596 | 12/1972 | Lloyd................................. | 61/72.3 |
| 3,854,297 | 12/1974 | Broussard et al..................... | 61/72.3 |

Primary Examiner—Trygve M. Blix
Assistant Examiner—Edward R. Kazenske
Attorney, Agent, or Firm—Ralph M. Watson

[57] ABSTRACT

A catamaran, adapted for use in laying a submerged pipeline, is provided with a slidable support for the pipeline, including a slightly inclined ramp integral with the awning deck of the catamaran for carrying out the operations for building the pipeline, a moveable stinger extending from the rear end of the catamaran, and an intermediate pipeline supporting element having its bow end hinged to the stern end of the ramp and its stern end pivotally hooked to the front end of the stinger. The stern end of the intermediate pipeline supporting element may be raised or lowered so that its angle of inclination may be varied and it may be locked in position at a selected angle of inclination through a castle-shaped member located abaft the catamaran and including two side frames fixed to the awning deck of the catamaran so that they straddle the intermediate pipeline supporting element and their lower ends are submerged. The frames are provided with vertically spaced pairs of opposed holes for the reception of check pins extending through holes located in the sides of the intermediate pipeline supporting element at its stern end.

3 Claims, 3 Drawing Figures

RAMP FOR SLIDABLY SUPPORTING A PIPELINE TO BE LAID ON A SUBMERGED BED

The present invention relates to an improved pipeline-supporting ramp. It relates, more precisely, to an intermediate supporting element, located between the fixed pipeline-discharging ramp of a pipe-laying vessel and the movable ramp or "stinger", which makes easier, faster, safer and less expensive the offshore laying on a deep submerged bed of a pipeline having a large diameter. The intermediate supporting element is incorporated in the pipe laying vessel and presents a pipeline-supporting surface which may be horizontally inclined at will.

As is well known, the offshore laying of a pipeline is an operation which is very often performed through a complicated set of coordinated manipulations under adverse weather and sea conditions. It is therefore evident that it is necessary to simplify and strengthen the apparatus used in such offshore laying so as to make the coordinated manipulations safer and easier and to obtain a greater reduction of the work times and consequently a more satisfactory economic benefit.

At present different kinds of apparatus for use in the offshore laying of a pipeline are known in the prior art, but all known forms of apparatus present various drawbacks of operating and economic types and from the point of view of safety.

In fact, one known laying apparatus installed aboard a pipe-laying vessel comprises a fixed, horizontal or slightly inclined plane for slidably supporting the pipeline to be laid, said plane being carried out on the deck of the vessel and extending fore and aft along almost the whole length of said vessel. All the main manipulations required by the offshore laying operation, such as tensioning of the pipeline to be laid by means of tensioning mechanisms, coupling of the pipes to the said pipeline, welding of the said pipes, radiography of said weldings and gunite coating of said pipeline, are easily made on the said fixed plane or ramp. Now, since in the offshore laying operation of a pipeline, as known, it is necessary to avoid kinking of the pipeline (which occurs when the bending radius of the longitudinal axis of the pipeline portion between the stern of the pipe-laying vessel and the submerged bed is smaller than a certain critical value, and the tractive force exerted on the pipeline by the said tensioning mechanisms cannot be of course unlimited) it is evident the afore-said laying apparatus presents the drawback of allowing the offshore laying only of pipelines having a small diameter and/or in shallow waters. In fact, pipelines with a large diameter, owing to the limited tractive force exertable by the tensioning mechanisms, would inevitably suffer the kinking phenomenon.

According to another laying apparatus known to the prior art, to the stern end of the fixed plane or ramp of the pipe-laying vessel there is pivotally connected a movable ramp, a so called "stinger", which serves to support the pipeline to be laid in such a way as to reduce the value of the bending moment acting on the pipeline and to consequently avoid the kinking of the pipeline. Though the latter expedient allows the offshore laying on a deep submerged bed of pipelines having a large diameter, it is nevertheless to be borne in mind that, to avoid the kinking of the pipeline to be laid, use has to be made of stingers having a considerable length in that the considerable weight of the pipeline has to be suitably distributed on a stinger of considerable length.

Now, the sea currents and above all the superficial currents striking the stinger have such an influence on a stinger of considerable length as to give rise to considerable offsets of the latter, which has to lie on a plane perpendicular to the sea surface. Said offsets have to be rectified by complicated maneuvers of the pipe-laying vessel, which remarkably complicates the laying operation. On the other hand, weak sea currents, or a not perfectly calm sea overstress the long structure of the stinger so as to make it necessary to work only when the sea conditions are very good, which increases, owing to the variability of the sea state, the laying times and consequently the costs of the offshore laying of a pipeline.

A further form of apparatus for use in the offshore laying of a pipeline having a large diameter on a shallow or deep submerged bed does not make use, according to the prior art, of a stinger, but of a single, long movable ramp which is pivotally connected at its middle zone to the middle zone of the pipelaying vessel; all the operations made by the tensioning mechanisms, the welders, the devices checking the weldings and the apparatus for coating the pipeline and for coupling the pipes to the pipeline respectively being performed on said movable ramp which is inclined with respect to the horizontal plane according to the depth of the submerged bed whereon the pipeline is to be laid and to the diameter of the same pipeline; said ramp passing from an almost horizontal position when the laying is made on a shallow submerged bed to an almost vertical position when the laying is made on a deep submerged bed. Now, when the ramp is horizontally inclined and especially when the ramp is steeply inclined, various drawbacks happen. First of all the weight of the pipeline to be laid has to be now borne entirely by the tensioning mechanism installed on the ramp, so that said tensioning mechanisms have to be appropriately calculated and dimensioned, remarkably increasing the costs. On the other hand the considerable weight of pipelines having a large diameter makes the maneuverability of said tensioning mechanisms very difficult and increases the risks of the operation for tensioning the same pipeline. Furthermore, the variability of the inclination of the ramp as a function of the depth of the submerged bed and of the diameter of the pipe imposes complicated solutions with respect to the problems due to the consequent variability of the work plane, in that the personnel performing the operations of welding, conveying, positioning and coupling the pipes to the pipeline, said operations being carried out on the front part at the bow of the same ramp, must now work on a non-horizontal plane. When the ramp is then steeply inclined with respect to the horizontal plane, the said operations being carried out on the front part at the bow of the same ramp, must now be performed on a non-horizontal plane. When the ramp is then steeply inclined with respect to the horizontal plane, the said operations have to be carried out at a remarkable height above the sea level, which subjects personnel, when the sea is very rough, to all the troubles due to the rolling and pitching of the pipe-laying vessel. In the latter case, furthermore, it is also difficult to move the pipes to be coupled to the pipeline from the place where said pipes are stored, said place being usually at the lowest part of the vessel, to the upper end of the inclined ramp where said pipes have to be positioned so as to be welded to the free end of the pipeline to be laid.

An object of the present invention is to eliminate the afore-said drawbacks of the laying apparatus known to the prior art and to provide a ramp which makes easier, faster, safer and less expensive the offshore laying on a deep submerged bed of a pipeline having a large diameter.

This result is obtained, according to one embodiment of the present invention, by interposing between the slightly inclined fixed ramp of a catamaran, or another semi-submersible vessel used in laying a pipeline underwater, and a movable ramp or stinger, an intermediate pipeline-supporting element which is pivotally connected with its bow end to the stern of the said slightly inclined fixed ramp whereon all the operations for building the pipeline are carried out, while the stern end of the said intermediate element is pivotally hooked to the stinger and locked with check pins to the catamaran in one of the various positions imposing upon the intermediate element, rotatable around the bow hinges, the desired optimal inclination with respect to the horizontal plane according to the laying conditions depending, for the example, on the diameter of the pipeline and on the depth of the submerged bed.

The use of such an intermediate element, adjustable as to inclination for supporting the pipeline to be laid, besides minimizing the possibility of a breakage of the pipeline due to side stresses, since said element may be made of an exceptional stoutness in that it is wholly incorporated into the structure of the catamaran, also permits a remarkable reduction of the optimal length of the depth of the submerged bed and the diameter of the pipeline, of the stinger which has to be pivotally connected to the stern end of the same element, and hence a simplification in the structure of said stinger and a greater safety of use so that the possibility of a breakage of the pipeline to be laid is considerably reduced.

According to another embodiment of the present invention the said intermediate pipeline-supporting element, adjustable as to its inclination, is made of such a length that its position also corresponds to the smallest inclination with respect to a horizontal plane, i.e. practically with the same inclination as the fixed ramp of the catamaran, the hooking of the stinger to the stern end of the said element remains always under the sea surface at differing depths according to the inclination of the same element.

In such a way the forces applied to said stinger by external weather agents, sea waves and superficial sea currents are remarkably reduced, which makes it possible to carry out the laying operation under unfavorable weather conditions and to reduce the laying time with a consequent favourable incidence with respect to the economy of the whole laying operation.

According to another embodiment of the present invention the stern end of the said intermediate pipeline-supporting element, adjustable as to inclination, is locked to the catamaran by means of a castle-shaped structure located abaft the catamaran and constituted by two side frames which come down from the deck of the catamaran to which they are rigidly fixed, plunge into the sea and are connected to each other at their submerged ends by a connecting bar, said side frames acting as a guide for the said intermediate supporting element so that the latter element may be locked to the castle-shaped structure in a position corresponding to the desired inclination.

According to a further embodiment of the present invention, the rotation of the intermediate supporting element, adjustable as to inclination around its bow hinges to bring said element to the position corresponding to the desired inclination, is obtained by means of two ropes which are fixed to the stern end, on two sides, of the said intermediate element and wound around the hubs of a winch located on the deck of the catamaran.

This system, besides facilitating the rotation of the intermediate supporting element in the position corresponding to the desired inclination, also makes it possible to lift the stern end of said element to the height of the awning deck of the catamaran. In this way the intermediate element is protected from the impact of the sea waves and the catamaran is placed in its best attitude for navigation.

The invention will be now be illustrated in the accompanying drawings showing an exemplary and non-limiting embodiment in that the adoption of constructional techniques or equivalent members different from those named herein lies within the scope of the present invention.

Figure 1:
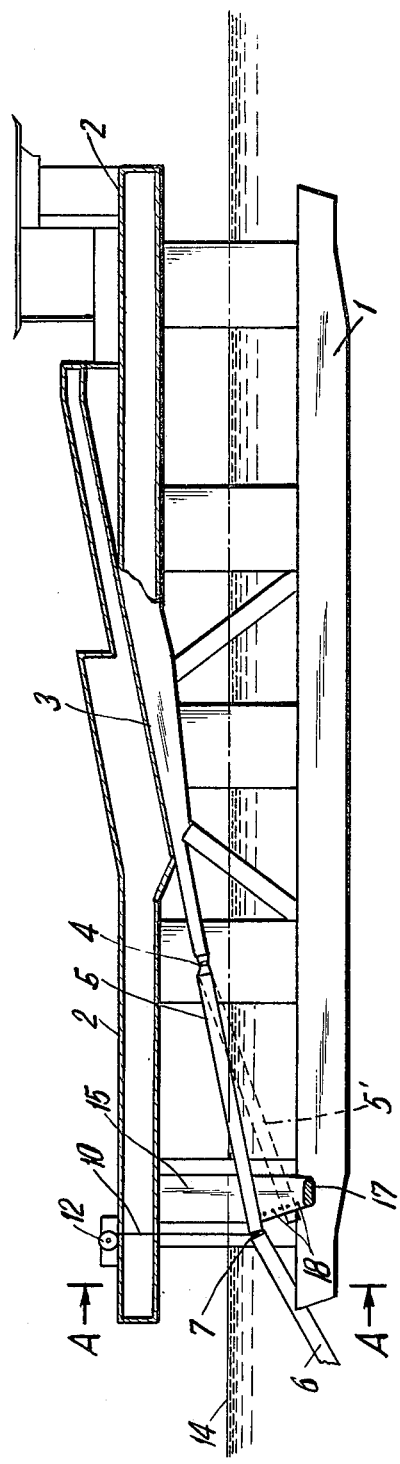
FIG. 1 is a schematic, longitudinal sectional view of a catamaran for laying a pipeline by making use of an intermediate supporting element adjustable as to inclination according to the invention.

In said drawing, reference numeral 1 indicates the body of a catamaran used in laying a pipeline underwater, which supports the awning deck 2 and the lightly inclined fixed ramp 3 whereon all the main operations for building the pipeline are carried out. To the stern end of fixed ramp 3 of the catamaran, according to the invention, there is pivotally connected by means of hinges 4 the bow end of an intermediate pipeline-supporting element 5 adjustable with respect to inclination, the other end of which is pivotally hooked to the movable ramp or stinger 6 by means of a hooking mechanism 7 which is not further described herein, since it has been described and illustrated in Italian patent application 31897 A/72 and the corresponding U.S. patent application, Ser. No. 411,417, filed Oct. 31, 1973.

Figure 3:
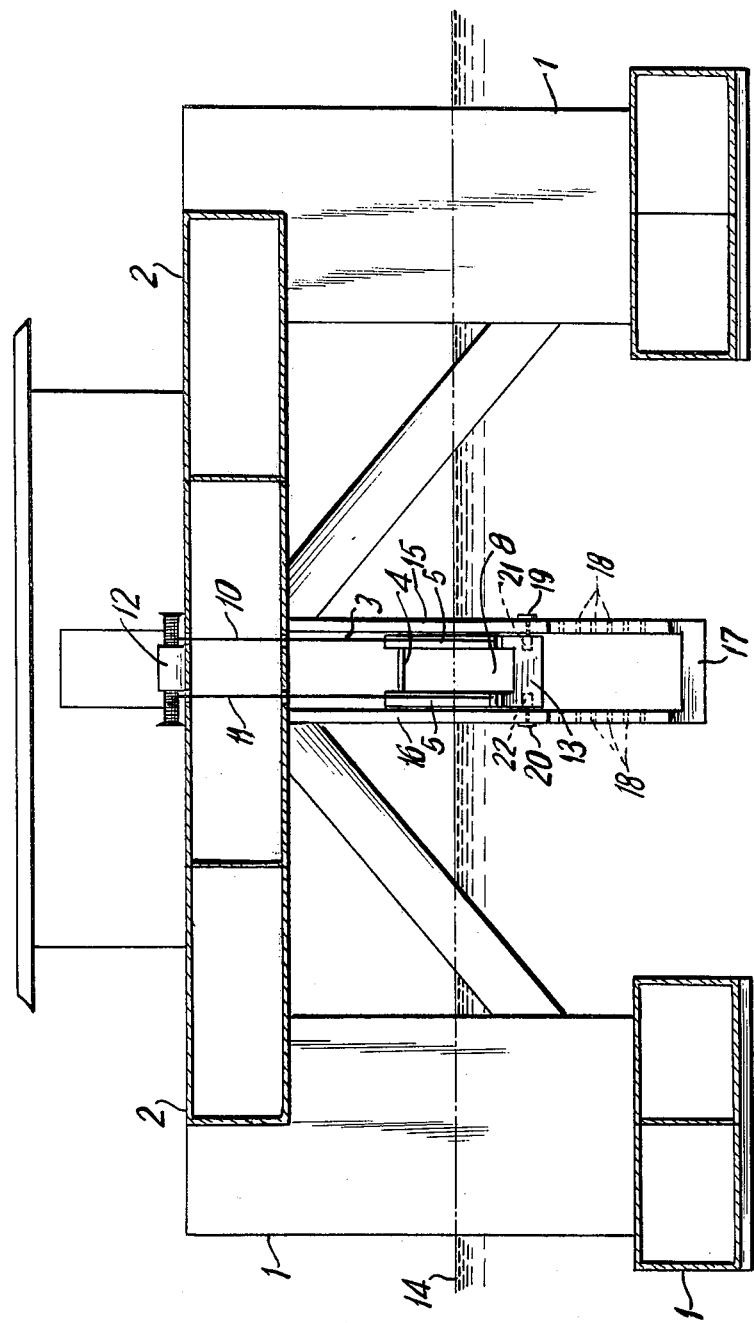
FIG. 3 is a front cross section on an enlarged scale of the catamaran, along line A—A of FIG. 1.

Said intermediate supporting element 5 is substantially constituted by a squared beam having a rectangular cross-section, which is grooved at its middle zone so as to contain the pipeline to be laid (see FIG. 3).

Figure 2:
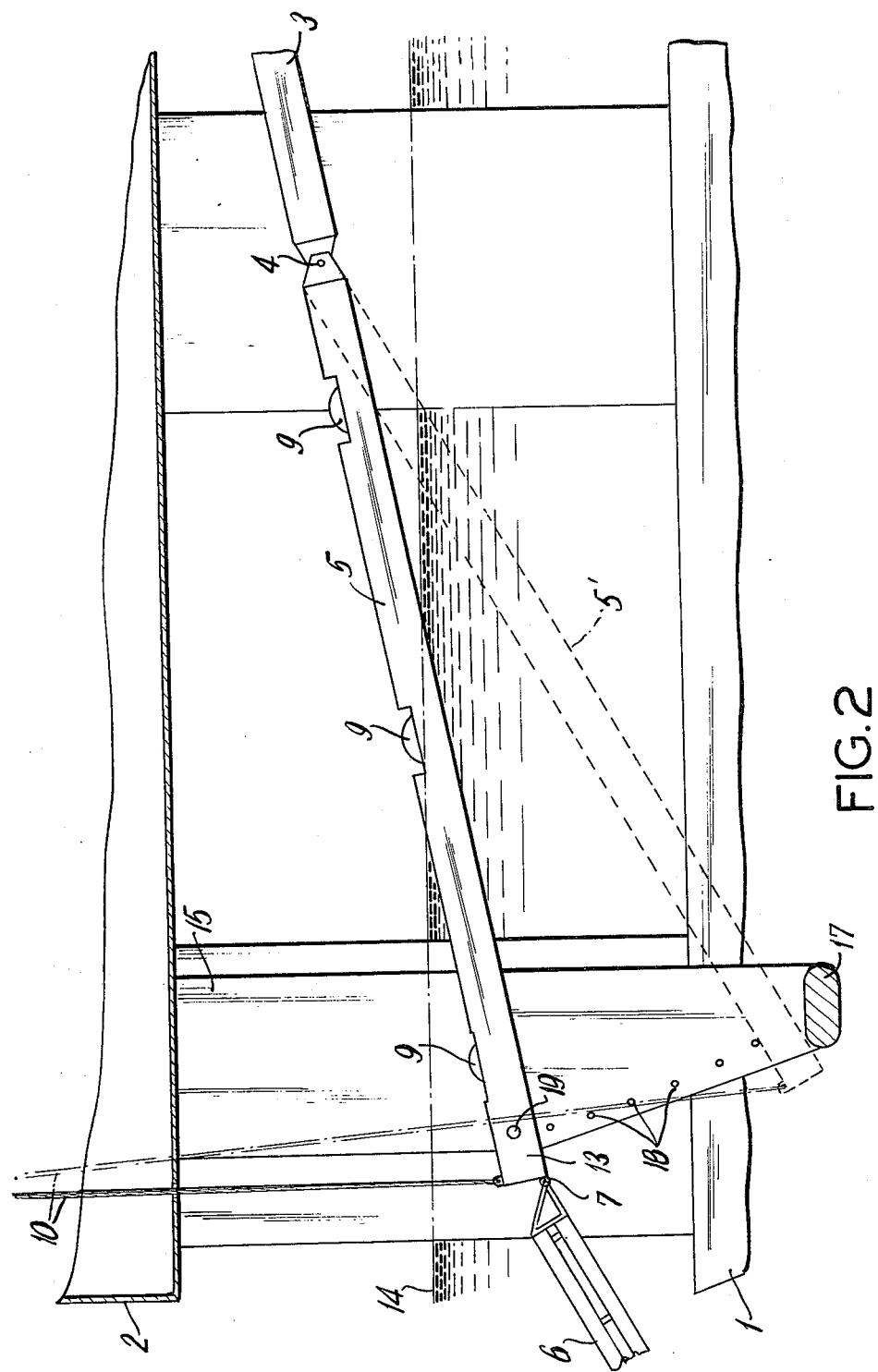
FIG. 2 is a schematic, longitudinal sectional view, on an enlarged scale, of the intermediate supporting element adjustable as to the inclination according to the invention.

Inside the central groove 8 of the intermediate supporting element 5 there are rotatable bearings 9 (see FIG. 2) which, regularly spaced from each other along the longitudinal axis of the element 5, serve to support the pipeline portion lying on the same intermediate element so that no kinking occurs in the pipeline to be laid and the sliding of the pipeline along the groove of the intermediate element may be carried out under optimum conditions. To the two sides of the stern end of intermediate element 5 there are fixed two ropes 10 and 11 respectively, whose upper ends are wound around the hubs of a winch 12 located on deck 2 of the catamaran. In such a way, by acting on winch 12 it is possible to rotate element 5 around its hinges 4 and to bring said element to a desired position corresponding to the optimal inclination with respect to the diameter of the pipeline to be laid and the depth of the submerged bed, said desired position being any of those comprised between the corresponding smallest inclination, i.e. an inclination like the one of fixed ramp 3, and the corresponding greatest inclination of the intermediate element, the latter position being represented in FIGS. 1 and 2 by dotted lines 5'. On the other hand, since intermediate supporting element 5, adjustable as to inclination, is mmade of a such length that, in its position corresponding to the smallest inclination, stern end 13 whereto stinger 6 is hooked remains always under the sea-surface 14, it is possible to lift by means of winch 12 said end 13 to the height of awning deck 2 so as to avoid the impact of the sea-waves against the same intermediate element 5 and to place the catamaran in its best attitude for navigation.

Intermediate element 5 is then locked in the said desired position corresponding to the optimum inclination whereto said element is brought by means of winch 12, by a castle-shaped structure located abaft the catamaran and rigidly fixed to the latter, said castle-shaped structure being constituted by two side frames 15 and 16 which come down from deck 2 of the catamaran, straddle the intermediate element 5, plunge into the sea and are connected to each other at their submerged ends by a connecting bar 17 acting also as a shoulder and support for the intermediate element 5, when the latter is in its position corresponding to the greatest inclination. Said side frames 15 and 16, which act as a guide for the intermediate element 5 rotatable inside the said side frames around the hinges 4, are provided each with a set of holes 18 placed at differing heights, two of which holes, one for each side frame, are passed through by check pins 19 and 20 entering corresponding holes 21 and 22 located in the sides of intermediate element 5, so that the latter element may be locked to the castle-shaped structure in a position corresponding to the desired inclination.

What is claimed is:

1. Apparatus for laying a pipeline on a submerged bed, including a catamaran having an awning deck, a stern end and a bow end, and means for slidably supporting said pipeline on the catamaran including a slightly inclined fixed ramp integral with the awning deck of the catamaran upon which the operations for building the pipeline to be laid are carried out and a movable stinger extending from the stern of the catamaran, wherein the improvement comprises, an intermediate pipeline-supporting element hinged at its bow to the stern end of said slightly inclined ramp and having its stern end pivotally hooked to the bow end of said stinger, means for raising and lowering the stern end of said intermediate pipeline-supporting element so that its angle of inclination with respect to a horizontal plane may be varied, a castle-shaped structure located abaft the catamaran and constituted by two side frame members fixed to the awning deck of the catamaran so as to straddle the intermediate pipeline-supporting element with their lowest ends submerged and having a bar connecting said submerged ends, and a pair of check pins, said intermediate pipeline-supporting element having a pair of sides each provided with a hole at its stern end adapted to receive one of said check pins so that it projects outwardly therefrom, the side frame members having aligned pairs of spaced holes adapted respectively to receive the outer ends of the check pins projecting from the holes in the sides of the intermediate pipeline-supporting element to lock it in the position in which it has a selected angle of inclination with respect to a horizontal plane.

2. The improvement in apparatus for laying a pipeline on a submerged bed as claimed in claim 1, wherein the length of said intermediate pipeline-supporting element is such that its stern end is submerged when its angle of inclination with respect to the horizontal corresponds with that of said slightly inclined fixed ramp.

3. The improvement in apparatus for laying a pipeline on a submerged bed as claimed in claim 1, wherein said means for raising and lowering the stern end of the intermediate pipeline-supporting element is comprised of a winch mounted on the awning deck of the catamaran, and a pair of ropes having their lower ends fixed to the stern of the intermediate pipeline-supporting element and their upper ends wound around said winch.

* * * * *

UNITED STATES PATENT AND TRADEMARK OFFICE
CERTIFICATE OF CORRECTION

PATENT NO. : 3,967,461
DATED : July 6, 1976
INVENTOR(S) : Giovanni Rosa and Pasquale Brando It is certified that error appears in the above-identified patent and that said Letters Patent are hereby corrected as shown below:

Col. 3, line 15, after "stern" insert -- end --.

Col. 5, line 11, correct spelling of "made".

Col. 6, line 17, before "ends" correct "lowest" to read

-- lower --.

Signed and Sealed this

Thirty-first Day of May 1977

[SEAL]

Attest:

RUTH C. MASON
*Attesting Officer*

C. MARSHALL DANN
*Commissioner of Patents and Trademarks*